Aug. 8, 1961 E. E. CLINE 2,995,225
SELF-LOCKING DRIVE
Filed Oct. 16, 1958
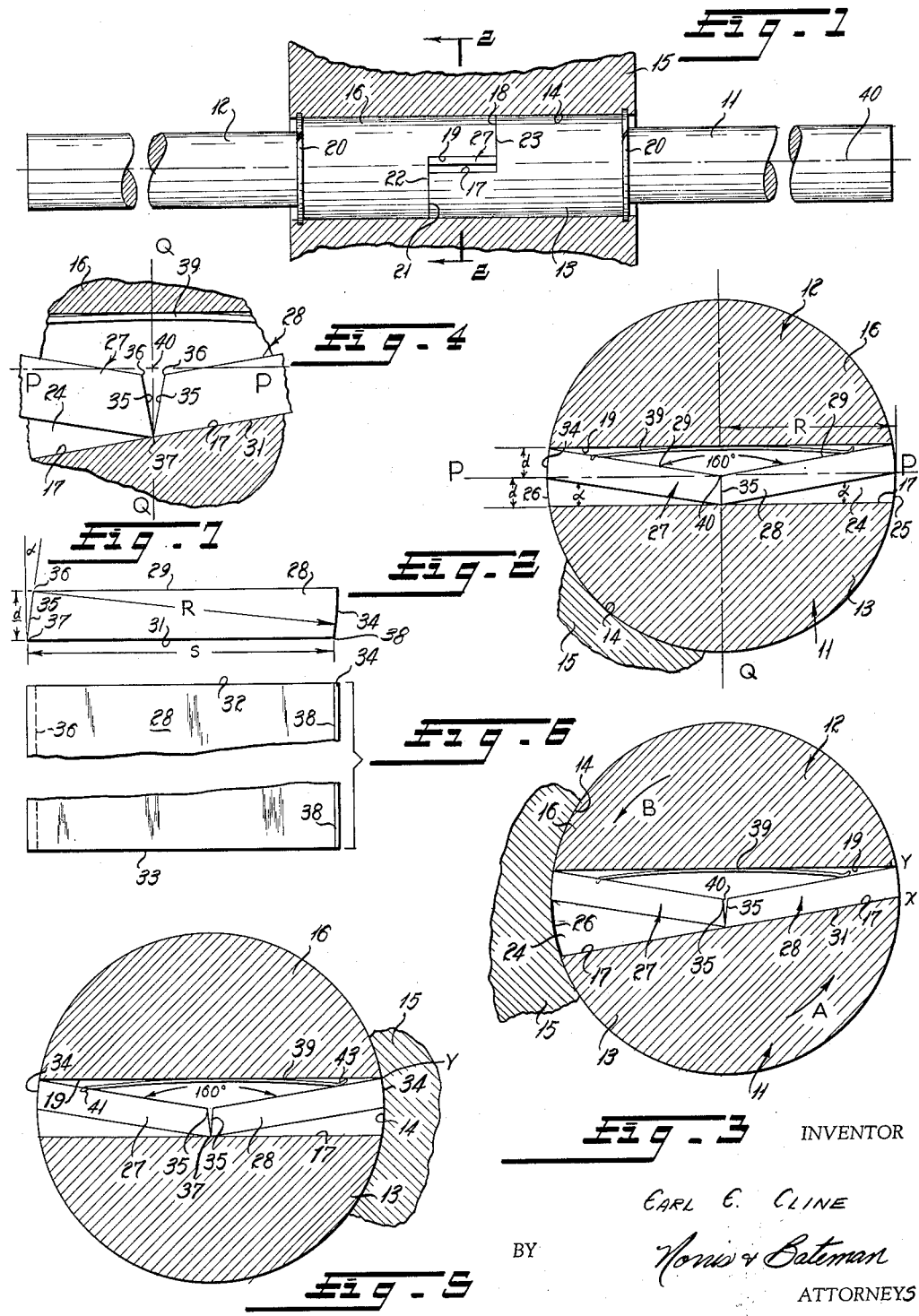
INVENTOR
CARL E. CLINE
BY
Norris & Bateman
ATTORNEYS

United States Patent Office 2,995,225
Patented Aug. 8, 1961

2,995,225
SELF-LOCKING DRIVE
Earl E. Cline, Chattanooga, Tenn., assignor to Ernest Holmes Company, Chattanooga, Tenn., a corporation of Tennessee
Filed Oct. 16, 1958, Ser. No. 767,677
11 Claims. (Cl. 192—8)

This invention relates to a clutching device for coupling together two rotatable members in torque transmitting relationship in either direction and for automatically preventing reverse rotation of the driven member due to load on the driven member when the driving torque is released, and particularly to a mechanically simple toggle mechanism for accomplishing the same.

Devices of this general character which are capable of transmitting torque in either direction and wherein the driven member is automatically locked against movement under load have been heretofore proposed. Most of them embody complex arrangements of multiple parts involving special associations of bars, rollers, cams, levers, balls, springs and/or other mechanical elements which are usually expensive and difficult to assemble and repair, or have short wear life due to complex design. The present invention accomplishes the purpose using a minimum of simple sturdy parts in novel relationship. It replaces such devices as ratchet mechanisms and self-locking worm drives which are expensive, complex and difficult to repair.

In its preferred embodiment the invention will be described as used in the hoist of a tow truck wherein a drive shaft driven from a power take-off is adapted to rotate a driven shaft carrying or connected to a pulley or the like of the hoist system. In such an embodiment it is desirable that when the drive torque is released the driven shaft should be positively locked against rotation due to the load on the hoist, and the invention satisfactorily accomplishes this locking action without any backlash. Other applications are equally available.

It is therefore the major object of the invention to provide a novel mechanically simple sturdy coupling device between rotatable members for torque transmission in either direction and wherein the driven member is automatically locked against reverse rotation due to load.

It is a further object of the invention to provide a novel toggle mechanism between two rotatable members which will transmit torque in either direction but will lock the driven member against rotation due to load thereon.

Further objects of the invention will appear as the description proceeds in connection with the appended claims and the annexed drawings wherein:

FIGURE 1 is a diagrammatic side elevation mainly in section showing the invention according to a preferred embodiment;

FIGURE 2 is a section substantially on line 2—2 of FIGURE 1;

FIGURE 3 is a section like FIGURE 2 but showing the parts in one drive position;

FIGURE 4 is an enlarged view in section showing the inner ends of the toggle arms in FIGURE 3;

FIGURE 5 is a section like FIGURE 1 showing the parts in locked position when the driven shaft is under reverse torque;

FIGURE 6 is a plan view of one toggle arm; and

FIGURE 7 is an end view of the toggle arm of FIGURE 6.

FIGURE 1 illustrates the invention as applied to a self-locking drive between a driving shaft 11 that is rotated by a source of power such as a power take-off connection to the power plant of a truck and a coaxial driven shaft 12 that is operably connected to a pulley or other like part of a load hoisting mechanism.

Driving shaft 11 has an enlarged cylindrical section 13 that is journalled in cylindrical bore 14 of a stationary block 15 or other support on the vehicle. Similarly driven shaft 12 has an enlarged cylindrical section 16 also journalled in bore 14. Shaft 11 and 12 project into opposite ends of bore 14.

The inner end of shaft section 13 is cut away to provide a transverse flat chordal surface 17 that intersects at right angles a flat radially extending axially facing surface 18. As shown in FIGURE 2 surface 17 is spaced a distance $d$ from a diametral centerline plane parallel to it.

The inner end of shaft section 16 is cut away to provide a transverse flat chordal surface 19 that intersects at right angles a flat radially extending axially facing surface 21. As shown in FIGURE 2 surface 19 is spaced the same distance $d$ from the diametral centerline plane parallel to it.

In assembly the shaft sections overlap axially in their cut-out portions so that the flat radial end face 22 of shaft section 13 may abut slidably against face 21 of shaft section 16, and the flat radial end face 23 of shaft section 16 may abut slidably against face 18 of shaft section 13, the axial lengths of surfaces 17 and 19 being substantially equal for this purpose. Suitable means such as snap rings 20 are seated in grooves of block 15 and relatively rotatably engage the ends of shaft sections 13 and 16 to maintain them axially in operative position.

This provides a space 24 between the shaft sections in the assembly which, when there is no driving force on shaft 11 or load force on shaft 12 as will appear, is essentially transverse and equally disposed on opposite sides of the diameter through the centerline of bore 14 as shown in FIGURE 2. The side boundaries of this space are the cylindrically curved bore wall sections as indicated at 25 and 26 in FIGURE 2.

Disposed within the space 24 are two coacting toggle arm locking members 27 and 28 which are identical. Referring to FIGURES 6 and 7 which show members 28, each locking member is essentially a rigid metal block having flat parallel upper and lower surfaces 29 and 31, spaced apart slightly less than the distance $d$ above mentioned, and flat parallel side surfaces 32 and 33 at right angles to surfaces 29 and 31.

The radially outer surface 34 of each locking member 27 and 28 is truly cylindrical with the same radius of curvature as bore 14. At their radially inward ends, each locking member has an inclined flat surface 35 which, as shown in FIGURE 7, is disposed at a predetermined angle $\alpha$, here about 10°, to the planes of surfaces 29 and 31, and has a length equal to $d$. As also shown in FIGURE 7 the dimension of each locking member radially of space 24 is such that the inner sharp line corner 36 where surfaces 29 and 35 intersect is spaced from the outer surface 34 by the distance R which is equal to the radius of the bore. In other words each line 36 is parallel to the axes of bore 14 and the shafts journalled in it and is the centerline of cylindrical surface 34 of its toggle arm member. The distance $s$ from the lower sharp line corner 37 of each toggle arm member at the intersection of surfaces 31 and 35 to the line 38 at the intersection of surfaces 31 and 34 is slightly but definitely greater than R.

Each of the locking members 27 and 28 is slightly less than one-half as thick as the space 24 in FIGURE 2, and in the assembly condition of FIGURE 2 with no rotatable drive force on shaft 11 and no counter rotatable load force acting on shaft 12 the locking members 27 and 28 are disposed as shown in FIGURE 2 with inclined inner flat end faces 35 in abutment in a plane that is perpendicular to a diametral plane Q at right angles to plane P, and surfaces 34 are in full surface engagement with the wall of bore 14. The corners 36 of the respective locking members 27 and 28 are substantially coincident and lie on the shaft axis 40. The corners 37 of the respective locking members are substantially coincident and lie essentially in plane Q below the axis 40 of shafts 11 and 12 a distance $d$. Corners 36, 37 and 38 are parallel. Resilient means in the form of a bowed leaf compression spring 39 is symmetrically disposed between the upper surfaces 29 of the locking members and surface 19 of the driven shaft section. Preferably spring 39 is a flat upwardly bowed sheet of spring steel having one end turned at 41 to lock into a retainer slot 42 in one locking member and the other end formed at 43 for freely slidably bearing on the surface 29 of the other locking member 28. The strength of spring 39 is such as to urge the parts into the FIGURE 2 locking condition with no power on shaft 11 and no load on shaft 12. The bowed center area of the spring contacts surface 19 where the latter is intersected by plane Q. The axial extent of spring 39 is approximately the axial extent of surfaces 17 and 19 but may be smaller.

Thus, in the no-drive no-load locked position of FIGURE 2, the parts are as shown with locking members 27 and 28 oppositely urged into locking engagement with bore 14 under the force of compression spring 39 which acts substantially equally on both of them. Since each member 27 and 28 effectively is pivoted on line 37, and the distance $s$ is greater than the radius of bore 14, this spring urged spreading of locking members 27 and 28 urges them tightly against the bore 14.

FIGURE 3 illustrates the condition that exists when shaft 11 is driving in the direction of the arrow A and there is a torque load on shaft 12. The driving shaft 11 first rotates relatively to shaft 12 through a small angle until one side of surface 17 abuts lower surface 31 of member 28. As shaft 11 rotates about axis 40 the surface 17 swings about that axis 40 in FIGURE 3 and effectively the position of corners 37 is displaced further away from axis 40. This permits spring 39 to relatively pivot the toggle members 27 and 28 until they assume the relative angular position of FIGURE 3 wherein a solid force transmitting connection is provided from shaft 11 to shaft 12 through member 28 in the arc X—Y to rotate shaft 12 in the direction of arrow B and toggle member 27 no longer binds against bore 14. The included angle between surfaces 35 in FIGURE 3 is about 20°.

The same operation takes place in reverse when shaft 11 is driven in the opposite direction.

FIGURE 5 shows the relative positions of the parts when drive shaft 11 is arrested against rotation, and preferably held by a brake, and a torque load on shaft 12 tends to rotate shaft 12 in either direction. For example, when the torque of shaft 12 is clockwise, engagement of surface 19 with member 28 at Y will tend to rotate member 28 about corner 37, but since the corners 37 of members 27 and 28 are abutting and the distance $s$ is greater than the radius of bore 14 the surfaces 34 of members 27 and 28 will be urged into tight engagement with bore 14 with a pressure that increases in proportion to the torque on shaft 12. This same action takes place in the opposite direction.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a self-locking drive mechanism, cylindrical coaxial bore means in which drive and driven shafts are journalled, means providing parallel spaced longitudinally overlapped surfaces rigid with the respective shafts, said surfaces being parallel to the axis of said bore means and spaced substantially equally on opposite sides of said axis, and toggle means disposed in the space between said surfaces comprising two similar rigid members abutting at their inner ends in a plane containing the axis of said bore means and formed at their outer ends for full surface engagement with said bore means, said members being disposed to define an obtuse angle between them with abutting adjacent edges engaging one of said surfaces and spring means reacting between the other of said surfaces and said members biasing said members toward radially aligned condition.

2. In the mechanism defined in claim 1 said spring means being a bowed leaf spring bearing at opposite ends in the respective rigid members.

3. In the mechanism defined in claim 1, said rigid members each being a flat arm having an internal beveled side containing one of said abutting edges, and having an outer cylindrical surface at said bore means.

4. In the mechanism defined in claim 3, each of said arms being a flat plate-like member having a thickness equal to substantially one-half of the perpendicular distance between said surfaces.

5. In the mechanism defined in claim 4, said arms having their beveled sides disposed at an angle of about 10° so that said obtuse angle between the arms is at least about 160°.

6. A toggle arm for a self-locking drive consisting of a rigid flat plate having respective inclined flat cylindrical opposite end surfaces, the line of one corner of said inclined surface being substantially coaxial with the axis of said cylindrical surface and the distance from the other corner to said cylindrical surface being greater than the radius of said surface.

7. In a self-locking drive mechanism, means providing a fixed cylindrical bearing bore, coaxial drive and driven members journalled within opposite ends of said bore, axially overlapping rigid end projections on said members within said bore, said projections having flat parallel faces that are disposed on opposite sides of the axis of said bore within the bore and define a toggle mounting space between said members, and a toggle assembly within said space consisting essentially of two similar rigid arms that abut and are effectively pivoted for relative movement at adjacent inner edges substantially on a diameter of said bore, extend oppositely with an included obtuse angle between them, and have their respective outer edges shaped to smoothly surface contact said bore.

8. In the drive mechanism defined in claim 7, a compression spring in said space within said obtuse angle and oppositely urging said arms.

9. In the drive mechanism defined in claim 7, each of said arms being a flat plate having an inclined flat inner end and a cylindrical outer end, each plate being about one-half as thick as said space, and the cylindrical surface of each plate having its axis coincident with one corner of said inclined inner end.

10. In the drive mechanism defined in claim 9, said obtuse angle being about 160° when said plates are in full surface abutment at said inclined ends.

11. In the drive mechanism defined in claim 7, means providing flat axially facing surfaces on the respective shafts in relatively rotatable engagement within said bearing bore.

References Cited in the file of this patent

UNITED STATES PATENTS

| | | |
|---|---|---|
| 1,213,227 | Manhard | Jan. 23, 1917 |
| 1,835,349 | Smith | Dec. 8, 1931 |
| 2,052,094 | Huff | Aug. 25, 1936 |
| 2,371,442 | Hammond | Mar. 13, 1945 |
| 2,573,939 | Verveille et al. | Nov. 6, 1951 |

FOREIGN PATENTS

| | | |
|---|---|---|
| 27,025 of 1912 | Great Britain | Nov. 25, 1913 |
| 358,432 | France | Dec. 18, 1905 |